United States Patent [19]

Cailleux et al.

[11] 3,980,943

[45] Sept. 14, 1976

[54] POWER SUPPLY WITH COMPLEMENTARY SWITCHING OF POWER TO MAIN AND AUXILIARY LOADS

[75] Inventors: Philippe Cailleux, Evreux; Claude Mothiron, Evreux-St-Michel, both of France

[73] Assignee: U.S. Philips Corporation, New York, N.Y.

[22] Filed: Apr. 27, 1971

[21] Appl. No.: 137,878

[30] Foreign Application Priority Data

Apr. 30, 1970 France .............................. 70.15916

[52] U.S. Cl. ........................... 323/22 SC; 307/39; 321/47; 323/23; 323/24
[51] Int. Cl.² ..................... G05F 1/44; G05F 1/56
[58] Field of Search .................. 307/38, 39, 41, 11, 307/12; 321/18, 19, 47; 323/4, 19, 22 SC, 75 E, 24, 23

[56] References Cited
UNITED STATES PATENTS

| | | |
|---|---|---|
| 3,229,191 | 1/1966 | Williamson ...................... 307/41 X |
| 3,258,613 | 6/1966 | Felcheck et al. ................ 307/38 UX |
| 3,426,259 | 2/1969 | Ziehm .............................. 307/41 X |
| 3,448,361 | 6/1969 | Dinter .............................. 307/38 X |
| 3,548,290 | 12/1970 | Swinehart ............................ 323/19 |

*Primary Examiner*—A. D. Pellinen
*Attorney, Agent, or Firm*—Frank R. Trifari; Bernard Franzblau

[57] ABSTRACT

A regulated power supply for drawing approximately constant power from an AC supply feeding a load that varies widely. A switching device in series between the AC supply and the load regulates the load current. A control circuit samples the load and controls the on-off state of the switching device in accordance therewith. A second switching device is connected between the AC supply and an auxiliary load and is switched on and off by the control circuit in synchronism as the first switching device is switched off and on, respectively.

19 Claims, 10 Drawing Figures

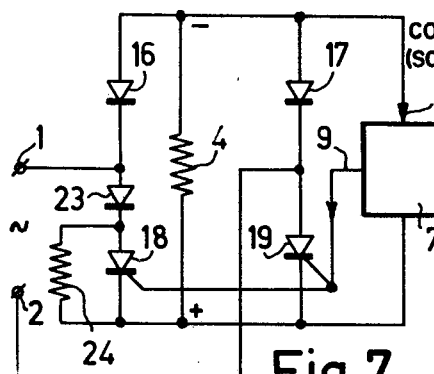
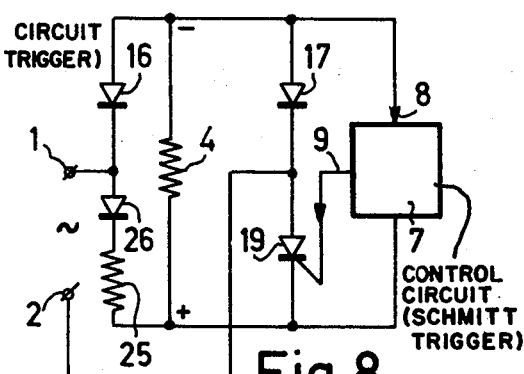
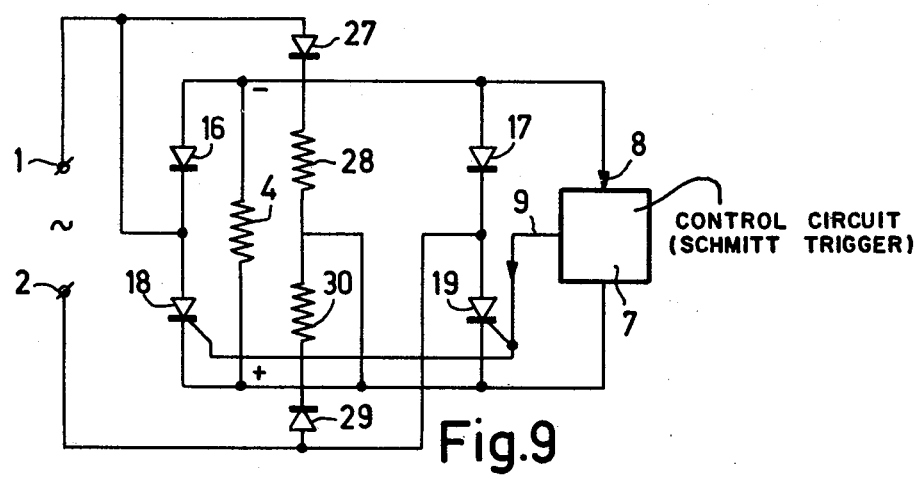
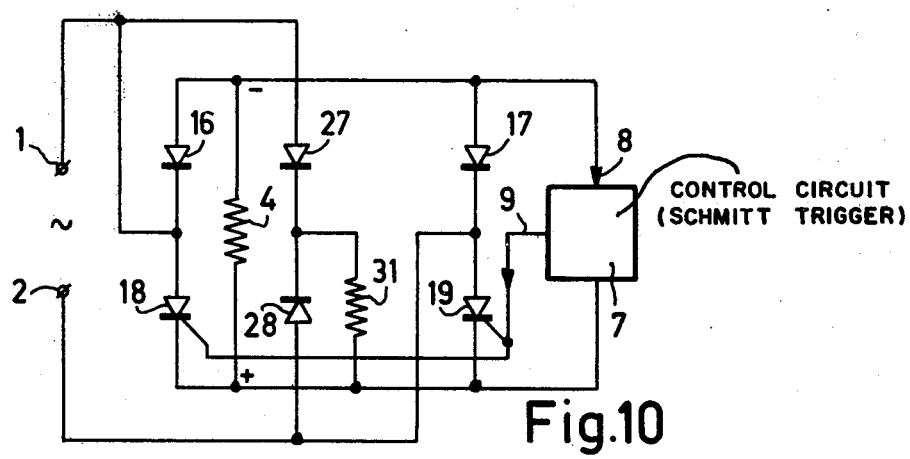

POWER SUPPLY WITH COMPLEMENTARY SWITCHING OF POWER TO MAIN AND AUXILIARY LOADS

This invention relates to a method of obtaining uniform power from an A.C. power supply for a device whose operation is checked and regulated by a synchronously switching circuit and whose working conditions involve substantial and frequent variations of the required power and to devices for carrying out said method.

Among the devices operating under such conditions are found, for example, the motors of drum washing machines in which the drum is horizontal or slightly inclined, the speed of the motor being checked by circuits including thyratrons or thyristors.

It is known that such circuits are capable of ensuring with very high strictness and excellent accuracy the check and the control of the speed of motors of the D.C. type, the inductor being formed by a permanent magnet and fed by a pulsating voltage resulting from the full-wave rectification of the alternating voltage of the power supply.

Owing to the strictness in operation of the control circuit and to the low inertia of the armatures of such motors, a very stable speed irrespective of the variations of the torque resulting from the relative movements of the washings and of the washing drum is obtained at the expense of great and frequent variations of the current intensity required from the power supply, which is not troublesome when the supply conditions are satisfactory or, so to say, normal.

When the internal impedance of the source formed by the power supply is abnormally high, the fluctuations of the consumed current introduce power supply voltage variations which may give rise to trouble.

An object of the invention is to reduce the magnitude of the fluctuations of the current taken by the devices of variable power, the current supply of which is checked and regulated by synchronous switching circuits that include at least one thyristor.

According to the invention the method of obtaining a uniform power is characterized in that by a complementary switching to the synchronous switching operation for the device concerned an auxiliary power is consumed during at least part of the time corresponding to the instants at which one of the synchronous switching circuits is opened.

In one form of the method embodying the invention the complementary switching may be obtained by static active means or by static passive means or by a conjunction of static active and passive means.

The static active means may be formed by thyristors, by semiconductor devices equivalent to two thyristors arranged in parallel opposition, known under the tradename of "Triac", or by transistors. The static passive means are formed by power diodes.

By continuing the consumption of a given power at the instants at which the regulating circuit practically cuts off the current supply to the checked device, the fluctuations of the absorbed current and any ensuing fluctuations of the voltage are markedly reduced. It is not necessary for the auxiliary power absorbed to be accurately equal to the main power in order to achieve satisfactory efficiency. Satisfactory results have been obtained by employing an auxiliary power which may vary approximately between one quarter and two-thirds of the main power in accordance with the manner of use.

The energy thus consumed is not wasted since, apart from other purposes, it can be dissipated, in the case of a washing machine, in an auxiliary heating resistor of the submerged heater type, which contributes to the heating of the liquids for washing and rinsing.

It has also been found that in a very simple arrangement for a washing machine comprising a horizontal or slightly inclined drum it is possible to dissipate the auxiliary power in the motor of the machine without adversely affecting the control of speed. In this case the auxiliary power is adjusted so that it corresponds approximately to the permanent mechanical losses of the motor and of the rotating washing and rinsing drum. Therefore, this auxiliary power does not bring about an undesirable acceleration of the motor and of the mechanism driven thereby, but it maintains the speed as if the inertia of the moving parts were considerably more important than it virtually is. At the instant when a variable torque reappears it does not coincide with a deceleration of the motor and the tub and the current absorption of this torque is much lower than in the event of coincidence. In this way a very satisfactory speed control is achieved while a considerably less varying power is required from the power supply. This may be employed by using static passive means, the arrangement thus bringing about only low costs.

The use of an auxiliary or dummy load for surge protection is described in United Kingdom Pat. Nos. 520,949 (Westinghouse Electric) and 1,152,239 (C.A.V. Limited).

The following description, given by way of nonlimiting example with reference to the accompanying drawings, will show how the method according to the invention may be carried into effect.

FIGS. 2 to 10 illustrate the basic diagrams of the various circuit arrangements of various embodiments for carrying out the method according to the invention.

Figure 1:
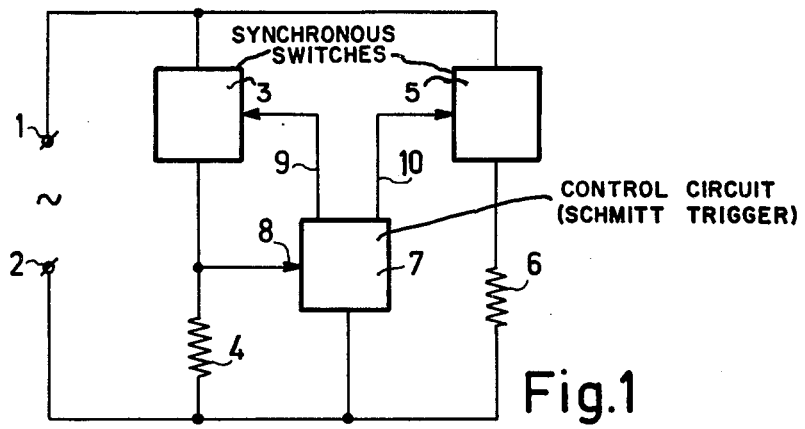
FIG. 1 is a block diagram of a circuit for carrying out the method embodying the invention.

Referring to FIG. 1, the A.C. power supply feeds in parallel from the terminals 1 and 2 a load means comprising a main load 4 and a compensation load 6 through bidirectional controlled synchronous switches 3 and 5, respectively. The term load connotes any device or complex of devices that consume electrical power from the AC supply terminals 1, 2. At an input terminal 8 a control block 7 receives information taken from the junction of the switch 3 and the main load 4, whereas the output terminals 9 and 10 of the control block 7, carrying complementary control-signals, are connected to the control-inputs of the switches 3 and 5. Control block 7 may comprise a conventional Schmitt Trigger that changes state in response to a given level of an input signal to provide simultaneous true and complement signals at first and second output terminals (9 and 10) thereof.

The circuit arrangement of FIG. 1 operates as follows:

The operational positions of the switches 3 and 5 are complementary, that is to say, one is closed when the other is open and conversely, nor can they be simultaneously open or closed. As a result the control-signals transferred by the connections 9 and 10 are complementary. If, for example, the voltage sampled at the terminal of load 4 is applied to the input 8 of the control block 7 and exceeds a given value, the signals transferred by the connections 9 and 10 are such that the switch 3 is opened and the switch 5 is closed. At this instant the load 4 is no longer energized, whereas the supply voltage is fed back to the terminal of load 6. When the voltage applied to terminal 8 decreases, the signals transferred by the connections 9 and 10 fluctuate in the inverse sense and the supply to the load 4 is re-established, while simultaneously that of the load 6 is cut off. It will be apparent that under these conditions the variations of the current at the terminals 1 and 2 during the changes of the signals transferred via the connections 9 and 10 are limited to those corresponding to the difference between the powers taken by the main load 4 and the auxiliary load 6, respectively.

Figure 2:
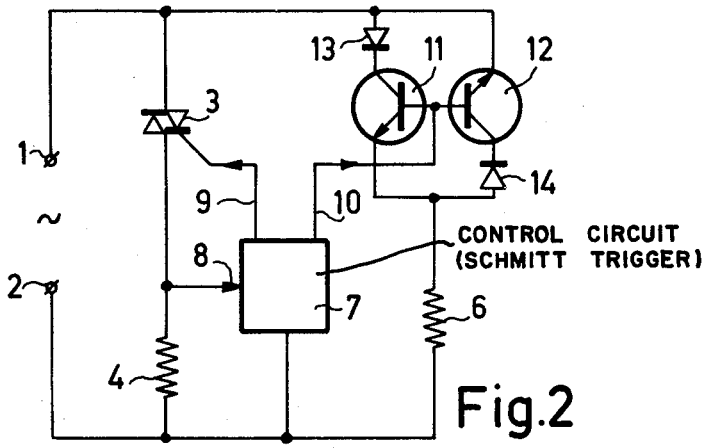

Referring to FIG. 2, in which the reference numerals of FIG. 1 are also used, the switch 3 for the main load 4 is formed by a bidirectional semiconductor device known under the tradename of "Triac", whereas the switch for the compensation load 6 is formed by two npn-type transistors 11 and 12 arranged in parallel opposition. The interconnected bases of the transistors 11 and 12 are connected to the output terminal 10 of the control block 7, while protective diodes 13 and 14 are connected in series with the collectors of each transistor.

The arrangement of FIG. 2 is formed by transistors 11 and 12 so that the current is cut off instantaneously in the compensation load 6 when the Triac 3 is ignited. The simultaneous change-over from the saturation state to the cut-off state of the transistors 11 and 12 interrupts without delay the passage of the current without the need for the sine voltage of the power supply to pass again through zero, as in the case of a "Triac".

The embodiments shown in FIGS. 1 and 2 relate to the case in which the main load receives alternating current. The following diagrams relate to an undulating voltage supply to the main load, said voltage resulting from full-wave rectification of the alternating voltage of the power supply. The reference numerals of the parts corresponding to the preceding diagrams are again used.

Figure 3:
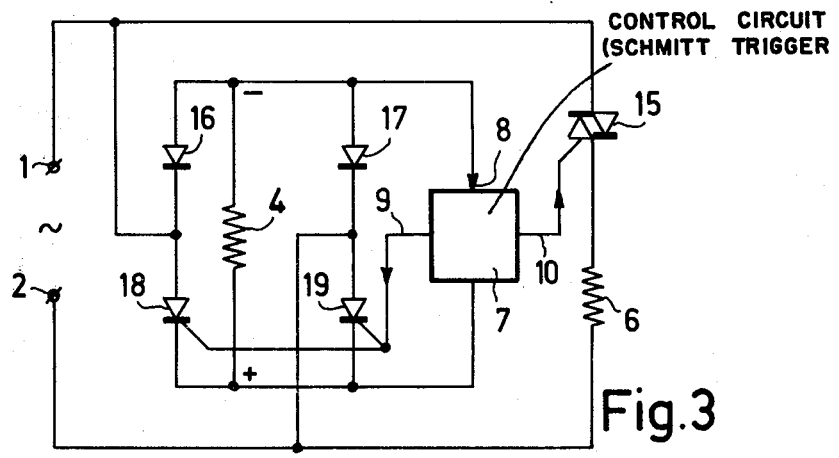

Referring to FIG. 3, the main load is supplied from the terminals 1 and 2 of the AC supply via a rectifying bridge formed by the diodes 16 and 17 and the thyristors 18 and 19, while the compensation load 6 is fed directly from the terminals 1 and 2 through a "Triac" 15. In the same manner as in the preceding arrangement, the compensation load 6 is fed when the thyristors 18 and 19 are cut off and conversely. It should be noted that in this diagram and in the following diagrams the ignition electrodes of the thyristors are drawn as being directly connected for the sake of clarity, omitting the details of the structure of the supply circuit of said ignition electrodes.

Figure 4:
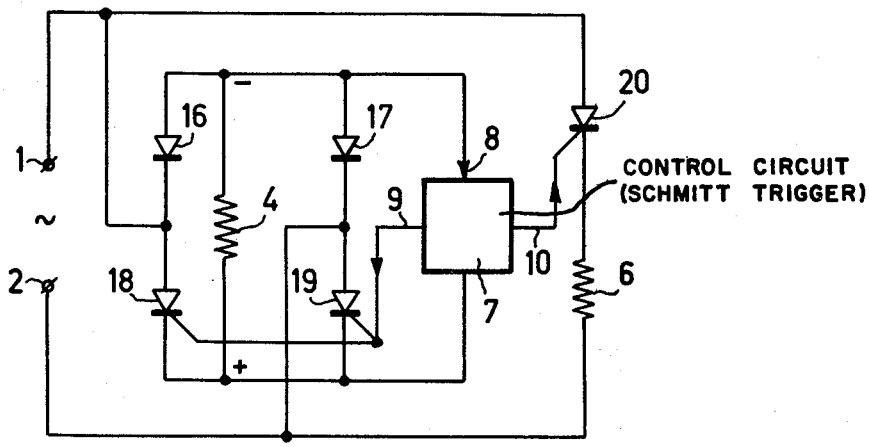

In the diagram of FIG. 4 the "Triac" 15 of the diagram of FIG. 3 is replaced by a thyristor 20. It will be apparent that under these conditions the compensation load 6 is fed, when the thyristors 18 and 19 are cut off, only during the half periods of the supply voltage, during which the anode of thyristor 20 is positive.

Figure 5:
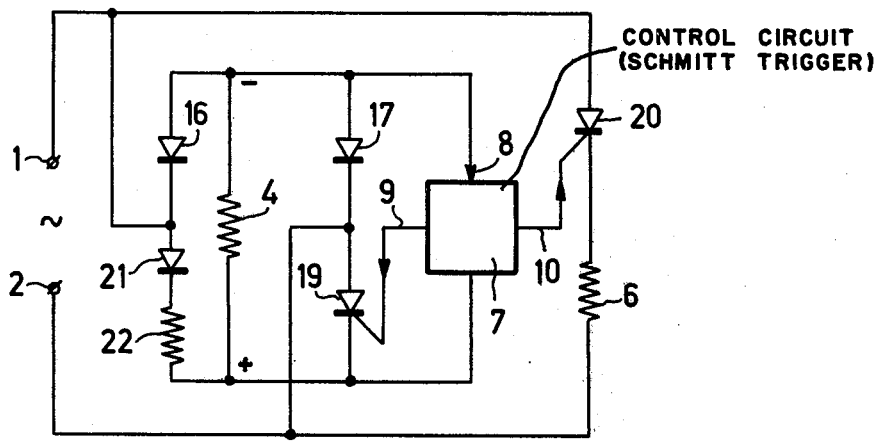

Referring to FIG. 5, the thyristor 18 of FIG. 4 is replaced by a diode 21 in series with a resistor 22. The load 4 is thus fed as before during the cut-off state of thyristor 19, for the whole duration of the half periods during which the diode 21 is conducting, the current being controlled by the value of resistor 22. The compensation load 6 is fed during the other half period of the supply voltage by the thyristor 20.

The forms of the method embodying the invention described above comprise, all of them, a compensation load fed via a separate switching element. In the following diagrams this arrangement is not used. The regulating block comprises only one control-output.

Figure 6:
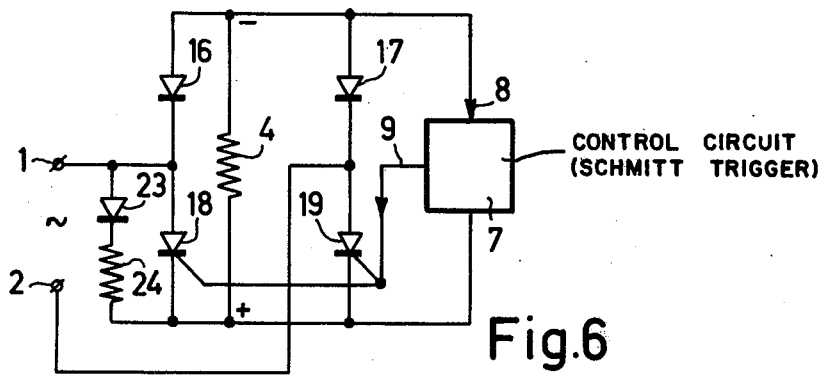

Referring to FIG. 6, the thyristor 18 is shunted by diode 23 in series with resistor 24. Under these conditions during each half period in which the diode 23 is conducting a current controlled by the resistor 24 continues circulating through load 4 when the thyristors 18 and 19 are cut off. The total load at this time essentially consists of resistors 24 and 4 in series.

A variant of the diagram of FIG. 6 is shown in FIG. 7. The diode 23 is connected in series with the thyristor 18, register 24 is connected in parallel with said thyristor and the operations of the two arrangements are completely comparable.

Referring to FIG. 8, the thyristor 18 of the preceding Figures is replaced by a static passive auxiliary synchronous switch consisting of a diode 26 in series with a resistor 25. Thus a current controlled by resistor 25 circulates through the load 4 during each half period of the supply voltage in which the diode 26 is conducting regardless of the state of the thyristor 19 during the other half period, i.e. whether it is closed or open.

FIG. 9 shows a diode 27 in series with a resistor 28 connected in parallel with the thyristor 18. In addition, a diode 29 in series with a resistor 30 shunts the thyristor 19. Under these conditions a current controlled by resistors 28 and 30 circulates through the load 4 for the duration of the cut-off period of the thyristors 18 and 19 during each half period of the supply voltage.

In the diagram of FIG. 10 the resistors 28 and 30 of FIG. 9 are united into a single resistor 31 having a value equal to one of the two resistors 28 or 30 and being capable of dissipating twice the power.

What is claimed is:

1. A method of obtaining uniform power from an AC electric source that supplies a device whose operational conditions require substantial and frequent variations of applied power comprising the steps of synchronously switching power to and from the device thereby to check and control the operation of the device, sampling a condition of the device and in response to a given condition of the device synchronously switching the power from the AC source in a manner complementary to the synchronous switching of the power to the device so that an auxiliary power is consumed during a part of the time corresponding to the intervals between the supply of power to said device.

2. A device for controlling the power drawn from an AC energy supply source by a variable main load exhibiting substantial and frequent variations of the required power during operation comprising, main synchronous switching means connected between the AC supply and the variable main load, control circuit means with an input coupled to the load and an output coupled to said switching means for controlling and regulating the load power, and auxiliary synchronous switching means arranged between the AC energy source and an auxiliary load.

3. A device as claimed in claim 2 further comprising means connecting an output of said control circuit means to said auxiliary synchronous switching means said control circuit means being arranged to cause complementary switching of said main and auxiliary switching means.

4. A device as claimed in claim 2 characterized in that the auxiliary load is formed in part by the main load.

5. A device as claimed in claim 2 characterized in that the auxiliary synchronous switching means are chosen from among semiconductor diodes, transistors, thyristors and bidirectional controlled semiconductor devices.

6. A device as claimed in claim 2 wherein at least one resistive impedance arranged is in series with the auxiliary synchronous switching means.

7. A device as claimed in claim 2 wherein the auxiliary load is formed in part by the main load and at least one resistive impedance arranged in series with the auxiliary synchronous switching means and the main load so that an auxiliary power is dissipated partly in the resistive impedance and partly in the main load.

8. A device as claimed in claim 2 further comprising means connecting an output of said control circuit means to said auxiliary switching means, said control circuit means being responsive to a main load parameter to switch said main and auxiliary switching means in synchronism so that when one is on the other is off, and vice versa.

9. A device as claimed in claim 8 wherein said main switching means comprises a semiconductor bidirectional current device and said auxiliary switching means comprises a pair of transistors connected in reverse parallel arrangement and in series with the auxiliary load across the terminals of the AC supply.

10. A device as claimed in claim 8 wherein said main switching means comprises a diode bridge circuit with input terminals connected to the terminals of the AC supply and output terminals connected to the main load to supply thereto a unidirectional load current, and said bridge circuit includes at least one arm having a thyristor device with its control electrode connected to the respective output of said control circuit means.

11. A device as claimed in claim 10 wherein two arms of the bridge each include a diode, a third arm includes a diode in series with a resistor, and a fourth arm includes said thyristor.

12. A device as claimed in claim 2 wherein said main switching means comprises a diode bridge circuit with input terminals connected to the terminals of the AC supply and output terminals connected to the main load to supply thereto a unidirectional load current, said bridge circuit includes at least one arm having a thyristor device with its control electrode connected to the respective output of said control circuit means, and wherein two arms of the bridge each include a diode, said auxiliary switching means comprises a third diode, and said auxiliary load includes a resistor connected in series with said third diode, said main load and one of said bridge diodes across the terminals of the AC supply.

13. A device as claimed in claim 12 wherein a fourth arm of the bridge includes a second thyristor device and said third diode is serially connected with said second thyristor device in said fourth arm of the bridge.

14. A device as claimed in claim 14 wherein said third diode and said resistor are serially connected in the fourth arm of the bridge circuit.

15. A device as claimed in claim 2 wherein said main switching means comprises a diode bridge circuit with input terminals connected to the terminals of the AC supply and output terminals connected to the main load to supply thereto a undirectional load current, said bridge circuit includes at least one arm having a thyristor device with its control electrode connected to the respective output of said control circuit means, and said auxiliary switching means comprises first and second diodes connected in series opposition across the terminals of the AC supply, and at least one resistor connected across the AC supply in series with at least one of said first and second diodes, said main load and an arm of the bridge that includes a diode.

16. A device as claimed in claim 12 wherein said auxiliary synchronous switching means comprises a semiconductor diode.

17. A device as claimed in claim 2 wherein said control circuit means is responsive to a parameter of the main load for operating said main and auxiliary synchronous switching means in a complementary manner such that when one is on the other must be off, and vice versa, thereby to prevent said main and auxiliary synchronous switching means from being simultaneously on and off.

18. A device for regulating the power from an AC supply source to a load means exhibiting substantial power variations comprising, synchronous switching means including first and second switching devices each connected in series with at least a part of said load means across the terminals of the AC supply, control means with an input coupled to the load means and an output coupled to said switching means to switch same on and off as a function of the load means and in a manner such that when said first switching device is switched off the second switching device provides a current path whereby said load means consumes an auxiliary power from the AC supply.

19. A device as claimed in claim 18 wherein said second switching device comprises a semiconductor diode connected in a first series circuit with said load means across the supply terminals and said first switching device comprises a controlled semiconductor element connected in a second series circuit with said load means across the said supply terminals.

* * * * *